D. P. JORDAN.
LETTER BOX.
No. 79,355. Patented June 30, 1868.
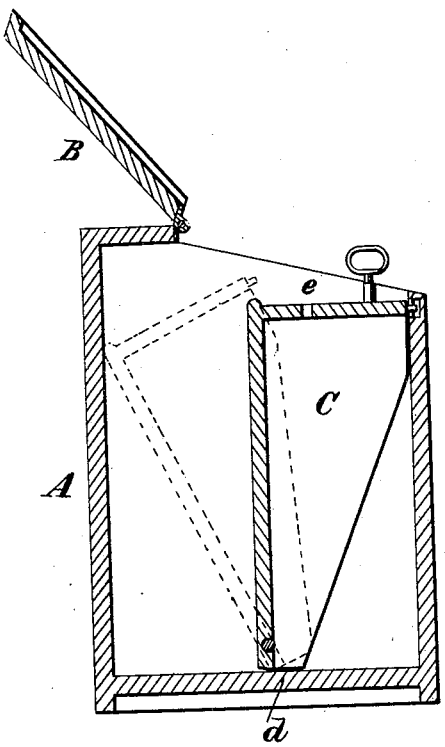

United States Patent Office.

D. P. JORDAN, OF CHICAGO, ILLINOIS.

Letters Patent No. 79,355, dated June 30, 1868.

IMPROVEMENT IN LETTER-BOXES.

The Schedule referred to in these Letters Patent and making part of the same.

TO ALL WHOM IT MAY CONCERN:

Be it known that I, D. P. JORDAN, of Chicago, in the county of Cook, and State of Illinois, have invented a new and improved Letter-Box; and I do hereby declare that the following is a full, clear, and exact description thereof, which will enable those skilled in the art to make and use the same, reference being had to the accompanying drawings, forming part of this specification.

This invention relates to an improvement in the method of receiving and securing letters, papers, &c.; and it consists in a novel combination of a letter and newspaper-box, as will be hereinafter described.

The drawing represents a vertical section of a box constructed and arranged according to my invention.

This box is of a square form, with an inclined cover or lid, as indicated in the drawing, to adapt it to out-door use, for which it may be used.

A is the main or newspaper-box, made of iron or wood, or any other suitable material.

B is the cover of the box.

C represents the letter-box, within the box A.

The letter-box C is hinged to the bottom of the box A, as seen at d, so that when opened or unlocked, it may be swung back, as seen in red line in the drawing, to give access to the inside for removing the contents.

e indicates a slot of the ordinary form in the top of the box, for the admission of letters.

As represented in the drawing, the letter-box is locked.

Newspapers are introduced into the box A over the letter-box, from which they are removed when the letter-box is closed, or without disturbing the letters.

When attached to doors of offices, or sides of buildings, or placed in any suitable position for the reception of letters and papers, the advantages of this arrangement will be obvious to all.

Having thus described my invention, I claim as new, and desire to secure by Letters Patent—

The letter-box C, in combination with the box A, when constructed and operating substantially as shown and described, for the purposes set forth.

D. P. JORDAN.

Witnesses:
F. O. E. ORRIS,
J. J. STEVENSON.